H. W. STONER.
COMBINATION CONDIMENT AND TOOTHPICK HOLDER.
APPLICATION FILED JUNE 11, 1915.

1,176,871. Patented Mar. 28, 1916.

Inventor
Harry W. Stoner
By F. A. Williams
Attorney

UNITED STATES PATENT OFFICE.

HARRY W. STONER, OF TRENTON, NEW JERSEY.

COMBINATION CONDIMENT AND TOOTHPICK HOLDER.

1,176,871.  Specification of Letters Patent.  Patented Mar. 28, 1916.

Application filed June 11, 1915. Serial No. 33,540.

*To all whom it may concern:*

Be it known that I, HARRY W. STONER, a citizen of the United States, residing at 42 Carroll street, in the city of Trenton, in the county of Mercer and State of New Jersey, have invented a new and useful Combination Condiment and Toothpick Holder, of which the following is a specification.

My invention relates to improvements in a combination condiment and tooth pick holder by which a means is provided for carrying condiments and tooth picks.

The object of my invention is to provide a holder for condiments and tooth picks which will be strong, secure, and sanitary and will be convenient to carry by a person carrying lunch with him, or who is hunting, traveling or fishing.

A further object of my invention is to provide means whereby a person may have an individual condiment and tooth pick holder at the dining table.

The objects and features of the invention will be more fully described in connection with the accompanying drawings, and will be more particularly pointed out and ascertained in and by the appended claims.

Figure 1:
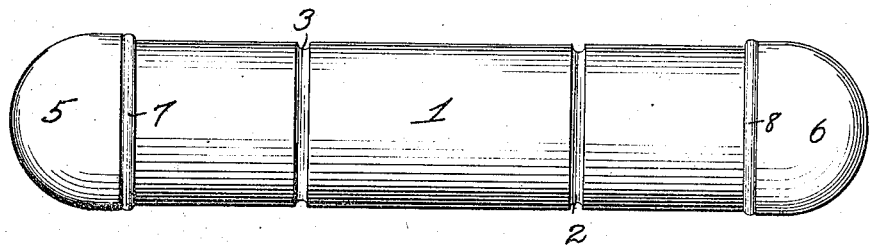
Figure 2:
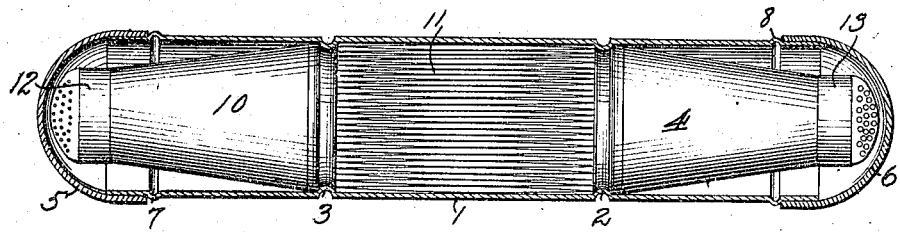

In the drawings:—Figure 1 is a side elevation of my invention showing the combination condiment and tooth pick holder with end covers in place. Fig. 2 is a longitudinal cross sectional view of my holder showing arrangement of parts.

Like characters of reference designate similar parts throughout the different figures of the drawing.

My invention may be made any desired size and of any suitable material.

As illustrated:—1 is a cylindrical tube, near the ends of which are the circumferential raised portions 7 and 8. Intermediate the raised portions 7 and 8 are the groove shaped circumferential indentations 2 and 3. Fitting tightly over the ends of tube 1 are the semi-spheroidal shaped removable caps 5 and 6 which when placed over the end of tube 1 are prevented from slipping over the end of the tube farther than desired by abutting against the raised portions 7 and 8 of tube 1.

Seated in both ends of tube 1 are the condiment retainers 4 and 10, each fitted with a perforated removable cap 13 and 12 respectively. Retainer 4 is seated on and held from longitudinal movement toward the center of tube 1 by circumferential indentation 2. Retainer 10 is seated on and held from longitudinal movement toward the center of tube 1 by circumferential indentation 3.

It will be observed that when condiment containers 4 and 10 are seated in tube 1 on circumferential indentations 2 and 3 respectively, caps 12 and 13 of said retainers extend longitudinally beyond the ends of tube 1 the object being to present holding means for removing said retainers 4 and 10, when in place in tube 1, from said tube.

Intermediate retainers 4 and 10, when in place in tube 1, is compartment 11 for the holding of tooth picks.

Condiment retainers 4 and 10 may be removed from tube 1 by the removal of tube cap 6 or 5 respectively. The said condiment retainers 4 and 10 may be filled with condiments by removing caps 13 or 12 respectively. Tooth picks may be either removed or placed in compartment 11 by the removal of tube caps 5 or 6 and the removal of containers 10 or 4 respectively.

It is believed that the advantages and utility of my invention will be clear from the foregoing description, and while I have herein shown and described specific forms of my invention, I do not wish to be limited thereto, except for such limitations as the claims may import.

I claim:—

1. In combination, a tubular receptacle having an outwardly raised circumferential bead spaced from each end thereof, two inwardly raised circumferential beads intermediate said outwardly raised circumferential beads, removable receptacles fitted into said tubular receptacle and held in said tubular receptacle in longitudinal spaced apart relation by said inwardly raised circumferential beads, and removable caps fitted over the ends of said tubular receptacle and against said outwardly raised circumferential beads, said caps designed to hold said removable receptacles in fixed position in said tubular receptacle, substantially as described.

2. In combination, a tubular receptacle, removable receptacles fitted in said tubular receptacle in end-to-end relation, means integral with said tubular receptacle against which said removable receptacles rest and are held in end-to-end spaced apart relation from the longitudinal center of said tubular receptacle, removable means for closing the ends of said tubular receptacle, and means integral with said tubular receptacle to hold said means for closing said tubular receptacle from telescoping said tubular receptacle beyond a fixed point, substantially as described.

3. In combination with a tubular receptacle, an outwardly raised portion integral with and spaced from each end of said tubular receptacle, inwardly raised portions integral with said tubular receptacle intermediate said outwardly raised portions, removable receptacles fitted in said tubular receptacle and resting against said inwardly raised portions of said tubular receptacle, removable coverings fitted to the ends of said tubular receptacle and resting against said outwardly raised portions, substantially as described.

Signed at Trenton, New Jersey, this 9th day of June, 1915.

HARRY W. STONER.

Copies of this patent may be obtained for five cents each, by addressing the "Commissioner of Patents, Washington, D. C."